United States Patent [19]
Crider et al.

[11] Patent Number: 5,374,215
[45] Date of Patent: Dec. 20, 1994

[54] VERTICALLY ADJUSTABLE VENT COVER HAVING VENTURI CONE

[76] Inventors: Brian D. Crider, 3505 Tarpon Woods Blvd. #I408, Palm Harbor, Fla. 34685; Brian D. Lockett, 3191 Oaklawn Ave., Largo, Fla. 34641

[21] Appl. No.: 156,497

[22] Filed: Nov. 22, 1993

[51] Int. Cl.$^5$ ............................................. B60H 1/26
[52] U.S. Cl. ................................................. 454/136
[58] Field of Search ................... 454/4, 94, 136, 358, 454/368

[56] References Cited

U.S. PATENT DOCUMENTS 3,587,443  6/1971  Rapport ............................. 454/136

FOREIGN PATENT DOCUMENTS 421 of 1906  United Kingdom ................ 454/358
1128643  9/1968  United Kingdom ................ 454/4
582108  11/1977  U.S.S.R. .............................. 454/136

*Primary Examiner*—Harold Joyce
*Attorney, Agent, or Firm*—Joseph C. Mason, Jr.; Ronald E. Smith

[57] ABSTRACT

A vent cover for vehicles equipped with roof vents is raisable and lowerable from within the vehicle by rotating a crank. The cover includes a dome formed by a top wall, sidewalls that depend from the top wall, and a venturi cone member secured to an underside of the top wall. A vent base mounted to the roof of the vehicle has upstanding sidewalls so that air molecules exiting the vehicle must flow upwardly to pass over the top of the sidewalls and then downwardly to enter the atmosphere external to the vehicle. The air molecules are forced to flow downwardly after they have passed over the top of the vent base sidewalls by the sidewalls that depend from the top wall of the dome. The cooperative shape of the venturi cone member, the walls that depend from the top wall of the dome, and the upstanding sidewalls of the vent base creates a constricted area above the upstanding sidewalls where upwardly flowing air molecules must change their path of travel to flow downwardly. The constriction forces the air molecules to flow at a high rate of speed, creating a venturi effect that efficiently pulls stale air, smoke, fumes, and the like out of the vehicle.

12 Claims, 3 Drawing Sheets

VERTICALLY ADJUSTABLE VENT COVER HAVING VENTURI CONE

BACKGROUND OF THE INVENTION

1. Field of the Invention

This invention relates, generally, to vent covers for vent openings of the type commonly provided in recreational vehicles. More particularly, it relates to a vent cover that employs the venturi effect to enhance the venting function of the opening it covers.

2. Description of the prior art

The venting of stale air, smoke, fumes, and the like from large motor vehicles such as motor homes, recreational vehicles, buses, and the like has long been problematic. The opening of side windows causes unacceptable amounts of air turbulence and noise within the passenger compartment, and allows moisture entry during periods of rain.

Accordingly, vehicle manufacturers responded to the problem by forming vent openings in the roof of their vehicles, near the trailing end thereof, and by providing simple hatches to close the vent openings during rainfall. Typically, the hatch cover is hingedly mounted and has an open and a closed position.

The hatches perform quite well when the vehicle is traveling at relatively low speeds and when rainfall is nonexistent or very light. At high speeds, the hatches vibrate because their hinged mounting cannot handle the stresses created by the wind at such speeds. Moreover, during periods of heavy rainfall, the hatch must be closed; obviously, this defeats the purpose of the vent opening. A long trip in the rain in a vehicle equipped with a vent opening covered by a hingedly mounted hatch leads to the build-up of stagnant air, smoke, fumes and the like within the passenger compartment, just as if the vehicle were not equipped with a vent opening.

Inventors have also noticed that the above-described common vent opening is not very efficient in removing air from the passenger compartment, even when the vent cover is fully open and the vehicle is moving. Accordingly, U.S. Pat. No. 4,633,769 disclosed an improved vent whereby a fan is mounted in the vent opening to increase the velocity of air leaving the passenger compartment. It, too, relies upon a hingedly mounted hatch cover. Interestingly, a moisture sensor is provided to detect rainfall, and means activated by said sensor are operable to close the hatch cover when moisture is detected.

There is a need, then, for an improved vent cover that is not subject to the inadequacies of the known vent covers.

More particularly, there is a need for a vent cover that may remain open during periods of heavy rainfall so that the vent opening may continue to function even during said periods.

There is also a need for a vent cover that is stable even when fully opened on a vehicle traveling at high speeds into a head wind.

Moreover, a need is extant for a cover that enhances the venting function of the vent opening without requiring a fan.

However, when the prior art is viewed as a whole at the time the present invention was made, it was not obvious to those of ordinary skill in this art how these needs could be fulfilled.

SUMMARY OF THE INVENTION

The longstanding but heretofore unfulfilled need for a vent cover that efficiently removes air from a passenger compartment, which may remain open during periods of heavy rain, and which does not vibrate even when the vehicle is traveling at a high rate of speed, is now fulfilled by a vent cover including a vent base, of predetermined configuration and dimension, having upstanding sidewalls, a dome, of predetermined configuration and dimension, having a top wall and sidewalls depending from a peripheral edge of said top wall, said predetermined configuration and dimension of said top wall being substantially the same as the predetermined dimension and configuration of said vent base so that outermost peripheral edges of said top wall are disposed substantially directly above an uppermost edge of said sidewalls of said vent base, said sidewalls of said dome depending from said top wall peripheral edge being flared slightly radially outwardly to accommodate said upstanding sidewalls of said vent base radially inwardly thereof when said dome is lowered with respect to said vent base, a venturi cone member secured to an underside of said top wall, said venturi cone member being a hollow solid of revolution formed by rotating a concave arc about a perimeter of a circle of predetermined diameter, said circle having a center coincident with a vertical axis of symmetry of said vent cover, said dome having a hollow interior bounded by said top wall and said venturi cone member, said venturi cone member having a flat bottom wall, an opening formed in said flat bottom wall, said vent base including a central hub, an upstanding cylinder means having a lower end fixedly secured to said central hub and an upper end slidably received within the hollow interior of said dome through said opening formed in said flat bottom wall of said venturi cone, a piston slidably mounted within said cylinder means, an upstanding screw member disposed within said cylinder means, said piston screw threadedly engaged by said screw member, a rigid interconnecting means for interconnecting said piston and said top wall of said dome, a closure member disposed in closing relation to an uppermost end of said cylinder means, an opening formed in said closure means, said interconnecting means extending through said opening, an operator handle means connected to said screw member so that rotation of said operator handle means effects simultaneous and corresponding rotation of said screw member, means preventing rotation of said interconnecting means when said screw member is rotated by said operator handle means, and a seal member mounted to an underside of said dome top wall in vertically aligned relation to said uppermost edge of said upstanding vent base sidewalls so that said seal member is seated atop said uppermost edge when said dome is in said lowermost position.

It should therefore be clear that an important object of this invention is to provide a vent opening cover that harnesses the venturi effect to efficiently pull air from a passenger compartment of a vehicle equipped with a roof vent.

Another important object is to provide a vent cover that may remain open and in operation during periods of heavy rainfall.

Still another object is to provide a vent cover that maintains its stability even when the vehicle upon which it is mounted is traveling at a high rate of speed.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
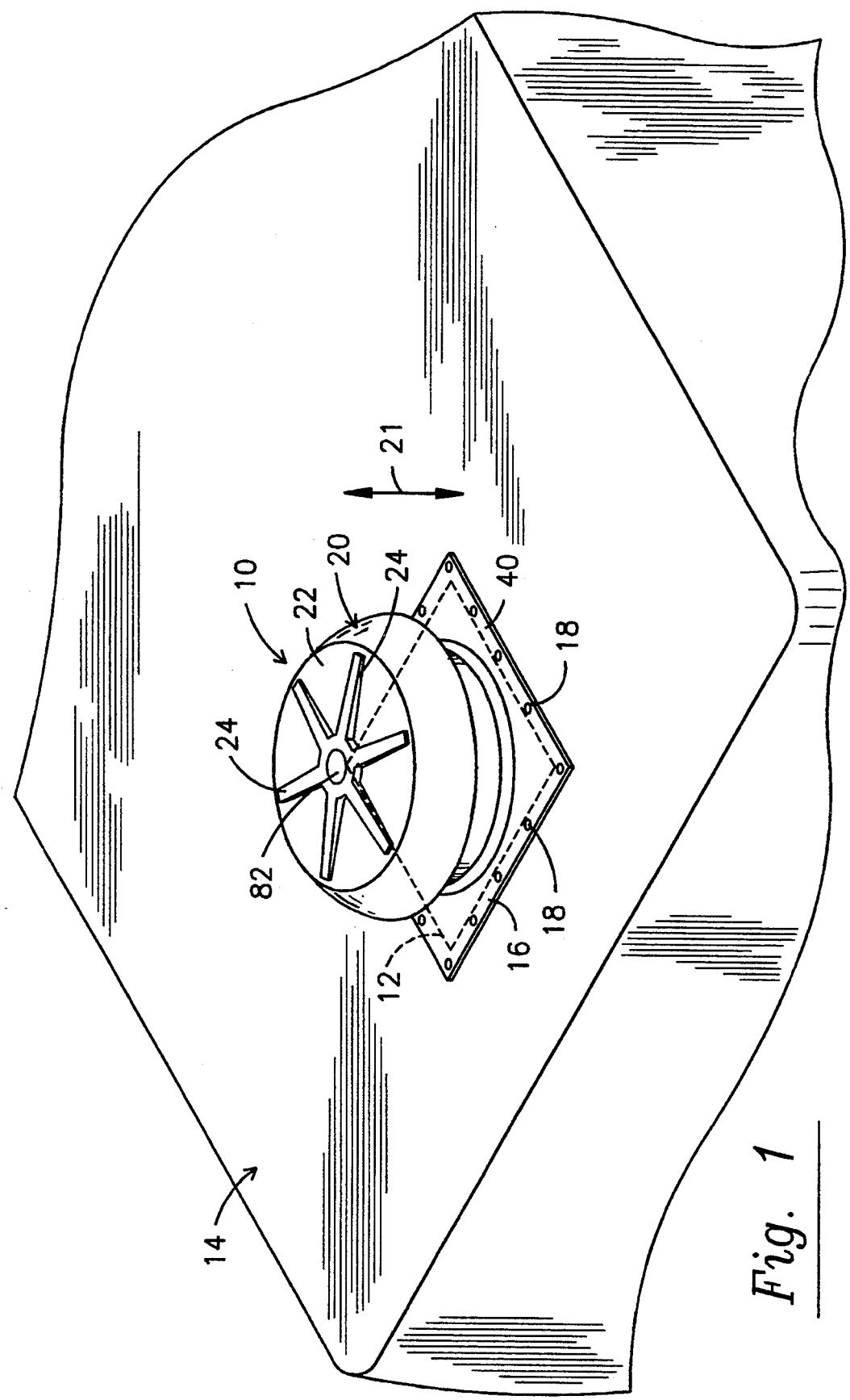
FIG. 1 is a perspective view of the roof of a vehicle equipped with the novel vent opening cover of this invention.

Referring briefly to FIG. 1, it will there be seen that an illustrative embodiment of the invention is denoted as a whole by the reference numeral 10; it is shown mounted in closing relation to the square vent opening 12 formed in the roof of a typical recreational vehicle 14. Square flange 16 is secured to the roof of the vehicle by plural screws 18 or other suitable fastening means such as rivets and the like; said screws extend into internally threaded bores formed in said roof by the vehicle manufacturer. Dome 20 is vertically adjustable, as indicated by double-headed directional arrow 21. Note that dome 20 has a flat top wall 22 strengthened by a plurality of radially disposed ribs 24 or other suitable strengthening means.

Figure 2:
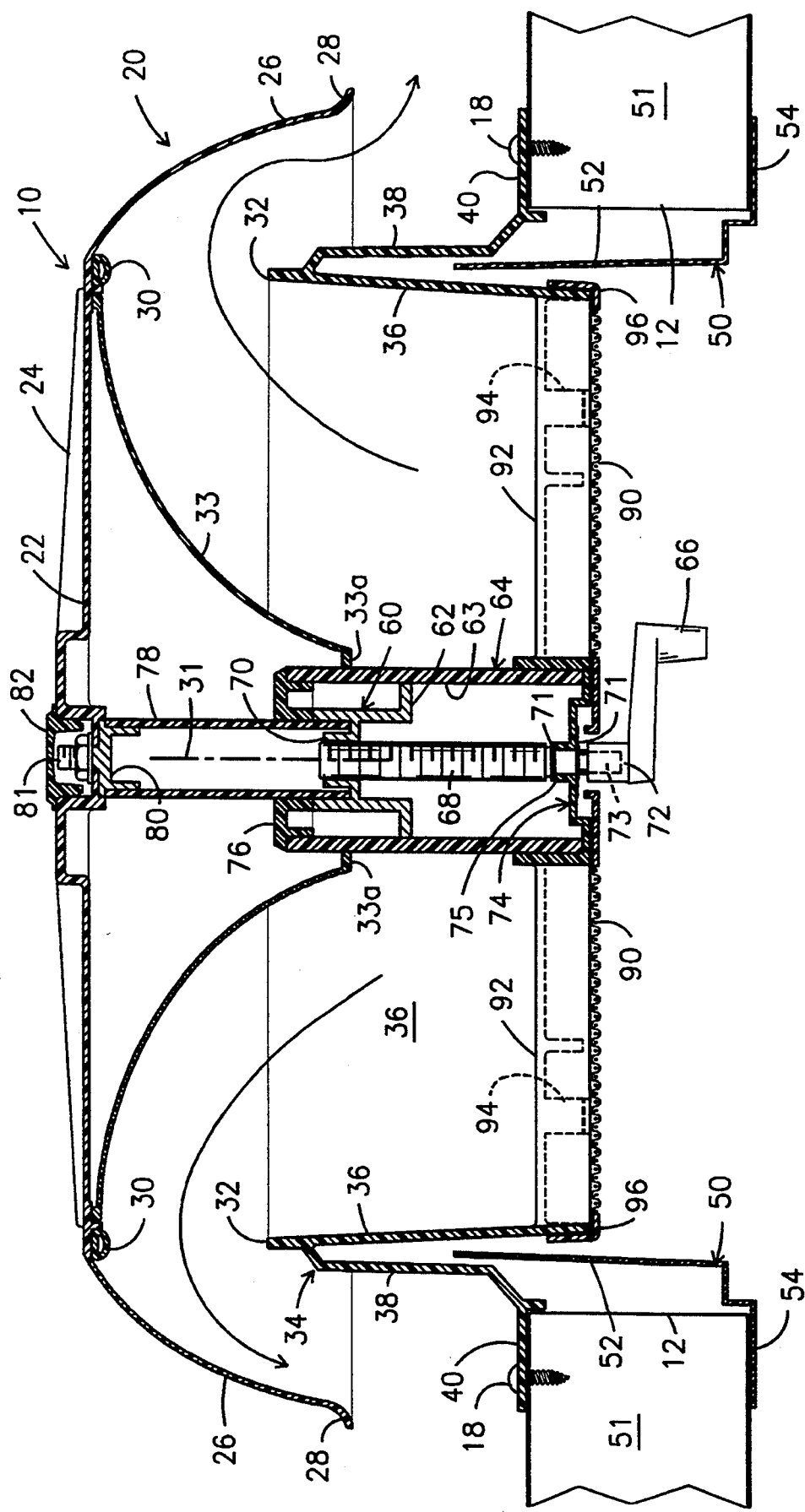
FIG. 2 is a sectional view of the apparatus when in its uppermost position.
Figure 3:
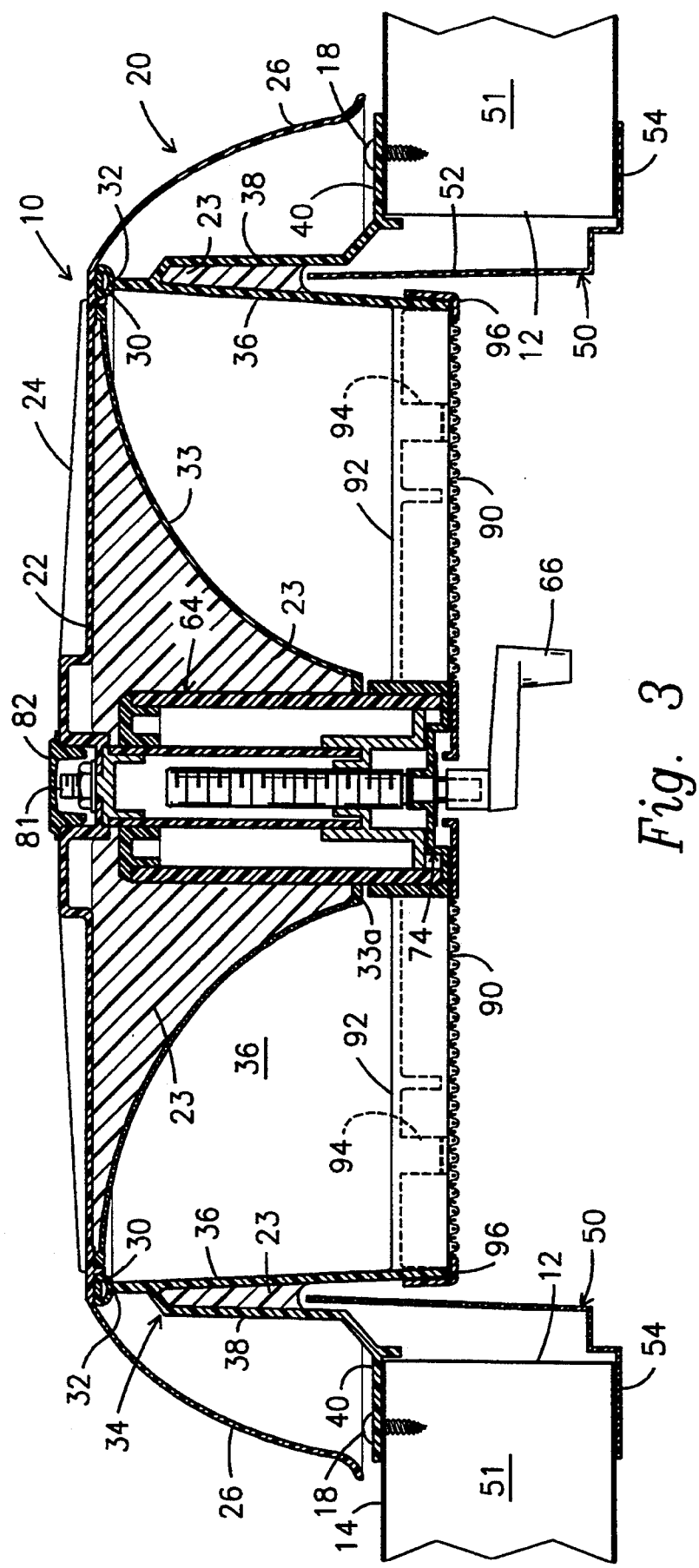
FIG. 3 is a sectional view thereof when in its lowermost position.

The exemplary embodiment of the invention 10 is disclosed in more detail in FIGS. 2 and 3; dome 20 is shown in its uppermost position in FIG. 2 and its lowermost position in FIG. 3.

Side wall 26 of the dome depends from and projects radially outwardly from the outermost periphery of top wall 22; it has a slightly bulbous or convex shape when viewed from its exterior, and terminates in a radially outwardly flared part 28 that is curved reversely with respect to the main curvature of said sidewalls.

An annular gasket 30 is fixedly secured to the underside of top wall 22 at its outermost periphery; gasket 30 is preferably hollow as depicted and is made of rubber or equivalent material having cushioning and air-sealing properties.

When dome 20 is partially or fully open, gasket 30 is spaced apart from its annular seat 32; when the dome is closed, gasket 30 sealingly engages said seat 32. Seat 32 is the uppermost rim of annular vent base 34. Note that vent base 34 has a cylindrical inner sidewall 36, an outer sidewall 38, and annular flange 40. As best understood in connection with FIG. 1, flange 40 is secured to the roof of the vehicle by a plurality of fasteners, collectively denoted 18, as mentioned earlier. Note space 37 between sidewalls 36 and 38; it provides thermal insulation.

Note that the respective predetermined configurations and dimensions of top wall 22 and vent base 34 are substantially the same; thus, the outermost peripheral edge of top wall 22 and hence gasket 30 are disposed directly above uppermost edge 32 of the sidewalls of vent base 34.

It is also important to compare FIGS. 2 and 3 to observe how said vent base sidewalls 36, 38 are accommodated with respect to depending sidewalls 26 of the dome as the dome is lowered, and how airflow out of the vehicle is affected as the vertical position of the dome is changed. The unnumbered single-headed directional arrows in FIG. 2 generally represent the path of travel of air molecules; obviously, the flow rate and path of travel of said molecules is affected by the positioning of the dome 20 with respect to the vent base 34.

The shape of the underside 33 of the dome contributes to the air flow pattern. Said underside will be referred to as a venturi cone to indicate that a venturi effect is created as the fast moving air molecules follow their respective paths of travel; this quickly draws the air molecules in the vehicle through the opening above the vent base sidewalls and into the atmosphere. Conventional hatches do not create such venturi effect and thus are less inefficient in removing stale air, smoke, fumes, and the like from the passenger compartment of the vehicle.

Venturi cone 33 is a concave hollow solid of revolution formed by rotating a concave arc about the vertical axis of symmetry 31 of the vent cover 10. More specifically, a concave arc is rotated about the perimeter of a circle of predetermined diameter, said circle having its center coincident with said axis of symmetry, as will be more fully set forth hereinafter. The hollow space 23 between top wall 22 and cone 33 provides thermal insulation.

Note that upwardly traveling air has a large space through which to flow between venturi cone 33 and sidewalls 36, 38 of vent base 34, a smaller space when directly above the vent base sidewalls, and a large space again as it flows downwardly. This arrangement creates a venturi effect, causing air molecules in the relatively narrow space directly above the vent base sidewalls to flow faster than the upwardly and downwardly flowing air molecules.

Trim ring 50 is positioned within the passenger compartment of the vehicle; it includes annular upstanding wall 52 and flange 54 formed integrally therewith. Note that the space between flange 40 of vent base 34 and flange 54 of trim ring 50 is occupied by the vehicle's roof 51 when vent cover 10 is installed. Note further that upstanding wall 52 is telescopically received between walls 36 and 38 of vent base 34 so that vent cover 10 may be secured to vehicles having roofs of differing thickness.

The assembly of parts that effects vertical displacement of dome 20 is shown at the center of FIGS. 2 and 3. Piston 60 has a radially outwardly extending flange 62 that slidably engages the inner sidewall 63 of cylinder 64. Reciprocation of said piston within said cylinder is accomplished by selective rotation of crank arm or operator handle 66; rotation of said handle effects simultaneous and corresponding rotation of externally threaded screw 68, and said screw engages internally threaded boss 70 formed in piston 60 as shown. Screw 68 is formed of aluminum or other suitable material. More particularly, base 72 of handle 66 has a non-circular blind bore 73 formed therein for the reception of a complementally formed, unthreaded lower end of screw 68. The lower end of screw 68 is held against vertical displacement by washer members 71, 71 disposed on opposite sides of boss 75 formed in hub member 74. The lower end of cylinder means 64 is secured to hub member 74 by a suitable adhesive such as MEK cement.

The open upper end of cylinder 64 is closed by closure means 76; MEK cement or a suitable substitute is employed to secure closure means 76 to cylinder 64. A central opening is formed in said closure means 76 to slidingly receive rigid interconnecting member 78 which performs the function of interconnecting piston 60 and dome 20. In the preferred embodiment, the interconnecting member 78 is square in transverse section, and the central opening formed in cover 76 is complementally formed. Other transverse sectional shapes, including circular, are within the scope of this invention but noncircular shapes are preferred because circular shapes require a key means to prevent rotation of the dome when the operator handle is cranked.

The open upper end of interconnecting means 78 is closed by closure means 80 which also includes an integrally formed screw means 81; a washer and nut retain the dome to said closure means as indicated. A rubber plug seal 82 performs the function its name implies to protect the screw threads, nut, and washer from moisture.

Note in the center of FIG. 2 that the lowermost end of venturi cone 33 is a flat bottom wall 33a disposed normal to the cylindrical sidewalls of cylinder 64 so that dome 20 may slide up and down relative to said cylinder 64 without binding, i.e., a centered opening formed in bottom wall 33a slidably receives cylinder 64, as perhaps best understood by comparing FIGS. 2 and 3.

The outermost periphery of wall 33a is the above-mentioned circle about which an arc is rotated to create venturi cone 33.

The final structural parts of the vent cover 10 are the screen 90 and the radial arms 92 upon which the screen is mounted. Arms 92 are formed integrally with and extend radially outwardly from hub 74. Internally threaded bosses 94 depend from said arms 92 at predetermined locations to accept the screws that secure the screen to said arms. The outermost peripheral edge 96 of the screen frame wraps about the lowermost end of inner wall 36 of vent base 34.

This unique arrangement of parts provides the first vent cover that harnesses the venturi effect to quickly remove stale air, smoke, fumes, and the like from the passenger compartment of vehicles. It also provides a vent cover that may remain open during periods of inclement weather. Moreover, it provides a vent cover having structural stability even when subjected to high winds.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A vent cover for a roof of a vehicle, comprising:

a vent base, of predetermined configuration and dimension, having upstanding sidewalls;

a dome, of predetermined configuration and dimension, having a top wall and sidewalls depending from a peripheral edge of said top wall;

said predetermined configuration and dimension of said top wall being substantially the same as the predetermined dimension and configuration of said vent base so that outermost peripheral edges of said top wall are disposed substantially directly above an uppermost edge of said sidewalls of said vent base;

said sidewalls of said dome depending from said top wall peripheral edge being flared slightly radially outwardly to accommodate said upstanding sidewalls of said vent base radially inwardly thereof when said dome is lowered with respect to said vent base;

a venturi cone member secured to an underside of said top wall;

said venturi cone member being a hollow solid of revolution formed by rotating an arc about a perimeter of a circle of predetermined diameter, said circle having a center coincident with a vertical axis of symmetry of said vent cover;

a first thermal insulation means being provided by air contained between said venturi cone member and said top wall;

said dome having a hollow interior bounded by said top wall and said venturi cone member;

said venturi cone member having a flat bottom wall formed in its lowermost end;

an opening formed in said flat bottom wall;

said vent base including a central hub;

an upstanding cylinder means having a lower end fixedly secured to said central hub and an upper end slidably received within the hollow interior of said dome through said opening formed in said flat bottom wall;

a piston slidably mounted within said cylinder means;

piston reciprocating means for effecting reciprocating travel of said piston within said cylinder means;

a rigid interconnecting means for interconnecting said piston and said top wall of said dome;

a closure member disposed in closing relation to an uppermost end of said cylinder means;

an opening formed in said closure means; and said interconnecting means extending through said opening.

2. The vent cover of claim 1, wherein said piston reciprocating means includes an upstanding screw member disposed within said cylinder means, and means for screw threadingly interconnecting said piston and said screw member.

3. The vent cover of claim 2, wherein said piston reciprocating means further comprises an operator handle means connected to said screw member so that rotation of said operator handle means effects simultaneous and corresponding rotation of said screw member.

4. The vent cover of claim 3, further comprising means for preventing rotation of said interconnecting means when said screw member is rotated by said operator handle means.

5. The vent cover of claim 4, wherein said opening formed in said closure means is of square configuration and wherein said interconnecting means has a square transverse section that mates with said opening, said mating shapes being said means for preventing rotation of said interconnecting means when said screw member is rotated by said operator handle means.

6. The vent cover of claim 1, further comprising a plurality of radial arms extending from said central hub and a screen means for keeping large particles of debris from flowing through said vent cover and into the atmosphere external to the vehicle, said screen means being releasably secured to said radial arms.

7. The vent cover of claim 1, further comprising a seal member mounted to an underside of said dome top wall in vertically aligned relation to said uppermost edge of said upstanding vent base sidewalls so that said seal member is seated atop said uppermost edge when said dome is in said lowermost position.

8. The vent cover of claim 1, further comprising a trim ring secured to a ceiling within an interior of said vehicle, said roof of said vehicle being disposed in sandwiched relation between said trim ring and said vent base when said vent cover is installed, said trim ring having annular upstanding sidewalls that extend into the opening formed in the roof of the vehicle when the vent cover is installed.

9. The vent cover of claim 8, wherein said sidewalls of said vent base further include an inner sidewall and an outer sidewall, said inner and outer sidewalls being closely spaced apart from one another and defining an annular space therebetween, said inner and outer sidewalls telescopically receiving therebetween said annular upstanding sidewalls of said trim ring when said vent base and trim ring are secured to said roof of said vehicle, and said annular space between said inner and outer sidewalls providing a second thermal insulation means.

10. The vent cover of claim 9, wherein said vent base and said trim ring each has a square flange to match the square vent opening formed in the roof of the vehicle.

11. The vent cover of claim 7, wherein said sidewalls of said vent base have an annular construction, wherein said top wall is of circular construction, and wherein said seal member is of annular construction.

12. The vent cover of claim 2, wherein said means for screw threadingly interconnecting said piston and said screw member includes an internally threaded boss member formed in said piston.

* * * * *